(12) United States Patent
Tanaka

(10) Patent No.: US 9,030,694 B2
(45) Date of Patent: May 12, 2015

(54) METHODS AND SYSTEMS FOR DISPLAYING A NUMBER OF SHEETS ALLOWED TO BE SAVED TO AN EXTERNAL STORAGE

(71) Applicant: Kensuke Tanaka, Kanagawa (JP)

(72) Inventor: Kensuke Tanaka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/737,186

(22) Filed: Jan. 9, 2013

(65) Prior Publication Data
US 2013/0176594 A1     Jul. 11, 2013

(30) Foreign Application Priority Data

Jan. 11, 2012 (JP) ................................ 2012-003508
Dec. 13, 2012 (JP) ................................ 2012-272819

(51) Int. Cl.
*G06F 3/12* (2006.01)
*H04N 1/00* (2006.01)
*H04N 1/04* (2006.01)

(52) U.S. Cl.
CPC ............. *H04N 1/04* (2013.01); *H04N 1/00225* (2013.01); *H04N 1/00228* (2013.01); *H04N 1/00244* (2013.01); *H04N 1/00278* (2013.01); *H04N 1/00339* (2013.01); *H04N 2201/0039* (2013.01); *H04N 2201/0072* (2013.01); *H04N 2201/0081* (2013.01)

(58) Field of Classification Search
CPC .............................. H04N 1/04; H04N 1/00228
USPC ........................................................ 358/1.15
See application file for complete search history.

(56) References Cited

U.S. PATENT DOCUMENTS

| | | | |
|---|---|---|---|
| 2011/0051623 A1* | 3/2011 | Johnson et al. | 370/254 |
| 2011/0154479 A1* | 6/2011 | Terabe | 726/16 |
| 2012/0060122 A1 | 3/2012 | Tanaka | |
| 2012/0086981 A1* | 4/2012 | Ohishi et al. | 358/1.15 |

FOREIGN PATENT DOCUMENTS

| | | |
|---|---|---|
| JP | 2005-094486 | 4/2005 |
| JP | 2006-338210 | 12/2006 |

OTHER PUBLICATIONS

Windows XP.*
How to Assign Password Shared Folders Permissions, retrieved from http://www.kakasoft.com/password-protect-shared-folder/how-to-assign-shared-folder-permissions.html on Nov. 11, 2013.*

* cited by examiner

*Primary Examiner* — Eric A Rust
(74) *Attorney, Agent, or Firm* — Harness, Dickey & Pierce, P.L.C.

(57) ABSTRACT

An information processing system includes at least one information processing apparatus; a connecting unit configured to enable a connection with at least one device via a network; an acquiring unit configured to acquire attribute information on at least one distribution destination that is a destination of data to be distributed from the distribution destination, the distribution destination allowing a user to designate in the device; an output unit configured to output the acquired attribute information to the device via the network; and a distribution control unit configured to perform a process of distributing the data to the distribution destination designated by the user in the device after the attribute information is output to the device.

18 Claims, 16 Drawing Sheets

| DISTRIBUTION SETTING | ESTIMATED CAPACITY AFTER DISTRIBUTION<br>EXAMPLES OF AVAILABLE NUMBER OF SCANNING SHEETS |
|---|---|
| FORMAT: tiff (MONOCHROME)<br>SIZE: A3<br>RESOLUTION: 200 dpi | ESTIMATED FILE SIZE: 50 KB/SHEETS AVAILABLE NUMBER OF SCANNING SHEETS IS 20 IF REMAINING CAPACITY IS 10 MB BEFORE LIMIT VALUE IS REACHED |
| FORMAT: PDF (MONOCHROME)<br>SIZE: A4<br>RESOLUTION: 400 dpi | ESTIMATED FILE SIZE: 100 KB/SHEETS AVAILABLE NUMBER OF SCANNING SHEETS IS 10 IF REMAINING CAPACITY IS 10 MB BEFORE LIMIT VALUE IS REACHED |

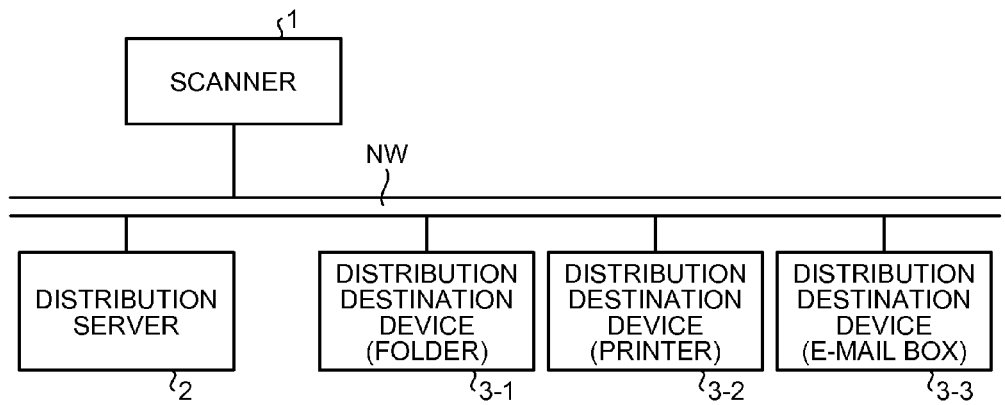
FIG.2
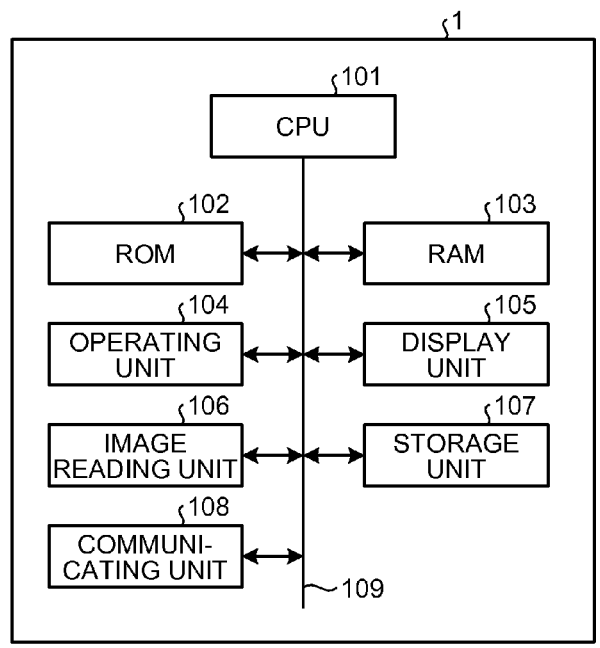

FIG.6

(a)
ADDRESS: \\10.11.12.13\scan
ATTRIBUTE INFORMATION:
· CAPACITY OF FOLDER: 50 MB
· WRITE ACCESS: AUTHORIZED (b)
DISTRIBUTION FOR PRINTING
PRINTER TO BE USED: PRINTER #1
ATTRIBUTE INFORMATION:
· STATE: AMOUNT OF REMAINING TONER: LOW
· NUMBER OF DOCUMENTS: 0

(c)
E-MAIL DISTRIBUTION
ADDRESS: taro@abc.com
ATTRIBUTE INFORMATION:
· CAPACITY OF E-MAIL BOX: 20 MB

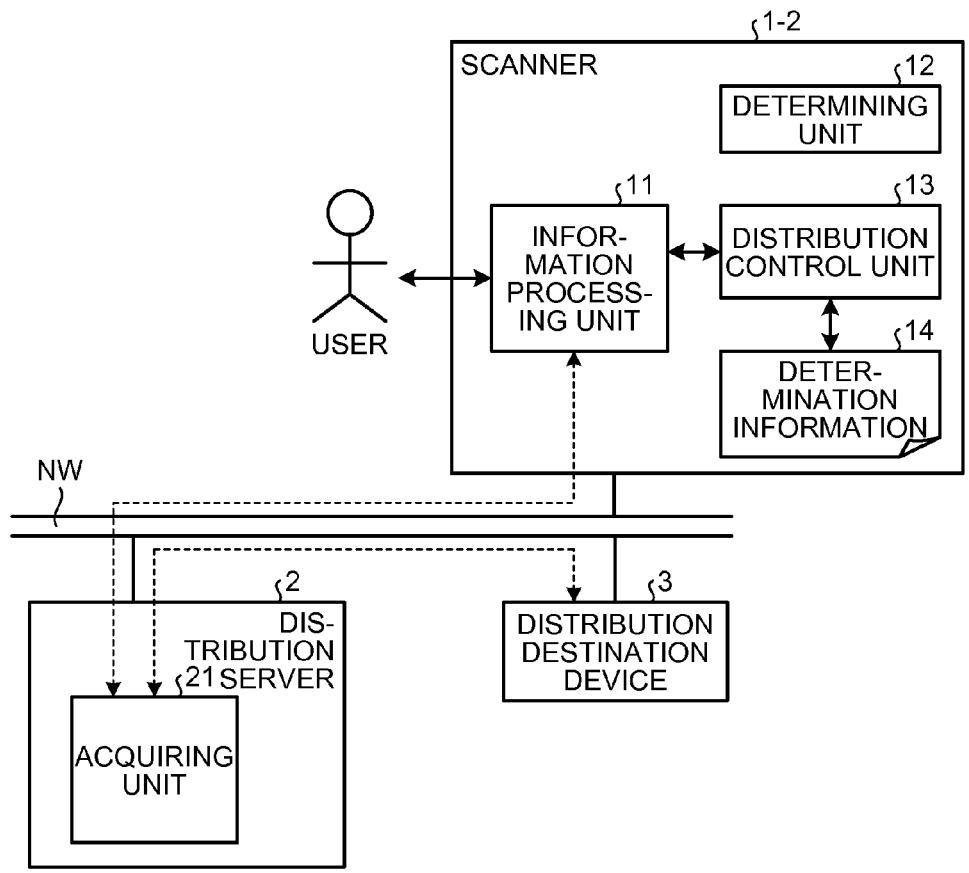

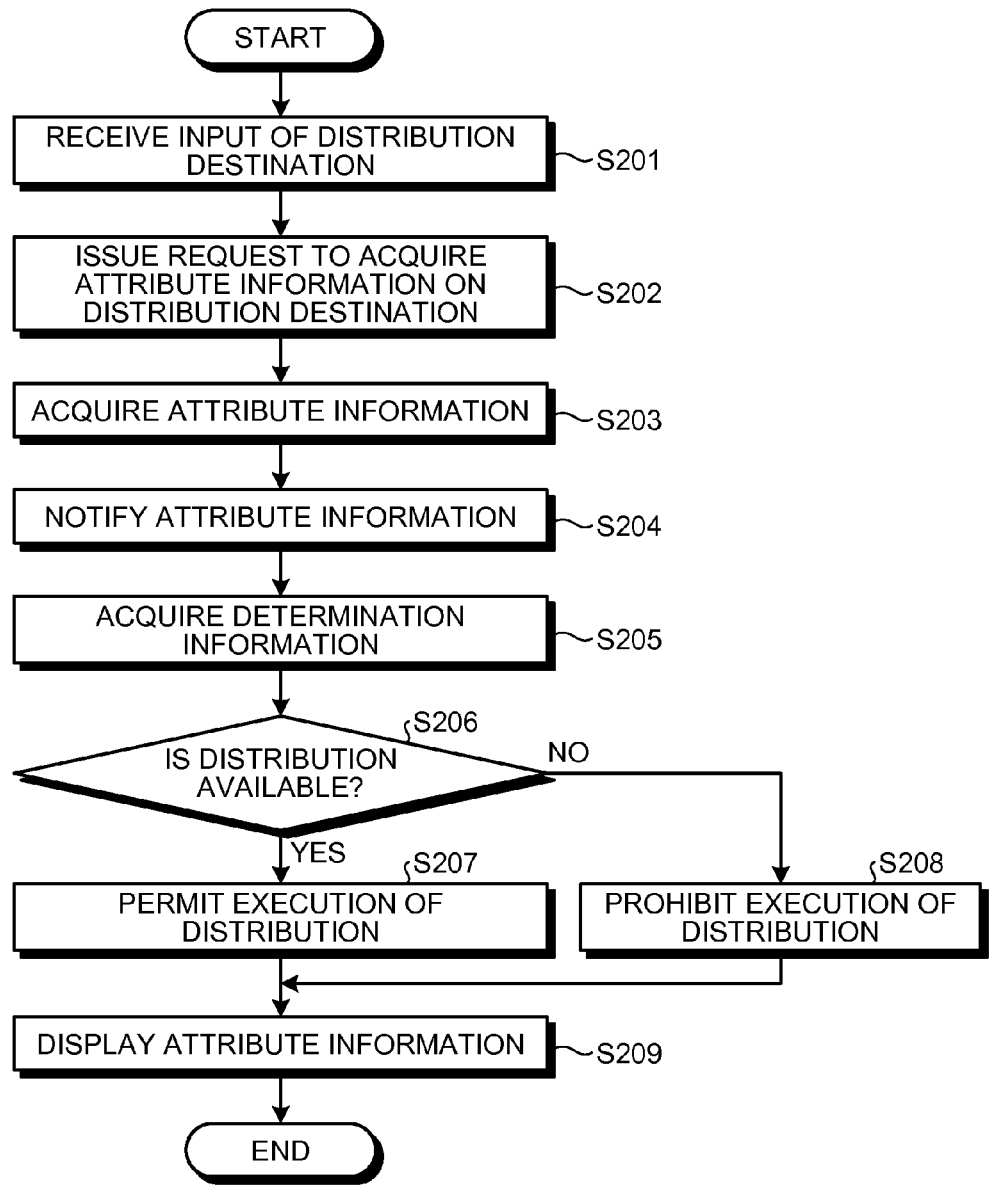

FIG.10

| DISTRIBUTION SETTING | ESTIMATED CAPACITY AFTER DISTRIBUTION EXAMPLES OF AVAILABLE NUMBER OF SCANNING SHEETS |
|---|---|
| FORMAT: tiff (MONOCHROME) SIZE: A3 RESOLUTION: 200 dpi | ESTIMATED FILE SIZE: 50 KB/SHEETS AVAILABLE NUMBER OF SCANNING SHEETS IS 20 IF REMAINING CAPACITY IS 10 MB BEFORE LIMIT VALUE IS REACHED |
| FORMAT: PDF (MONOCHROME) SIZE: A4 RESOLUTION: 400 dpi | ESTIMATED FILE SIZE: 100 KB/SHEETS AVAILABLE NUMBER OF SCANNING SHEETS IS 10 IF REMAINING CAPACITY IS 10 MB BEFORE LIMIT VALUE IS REACHED |

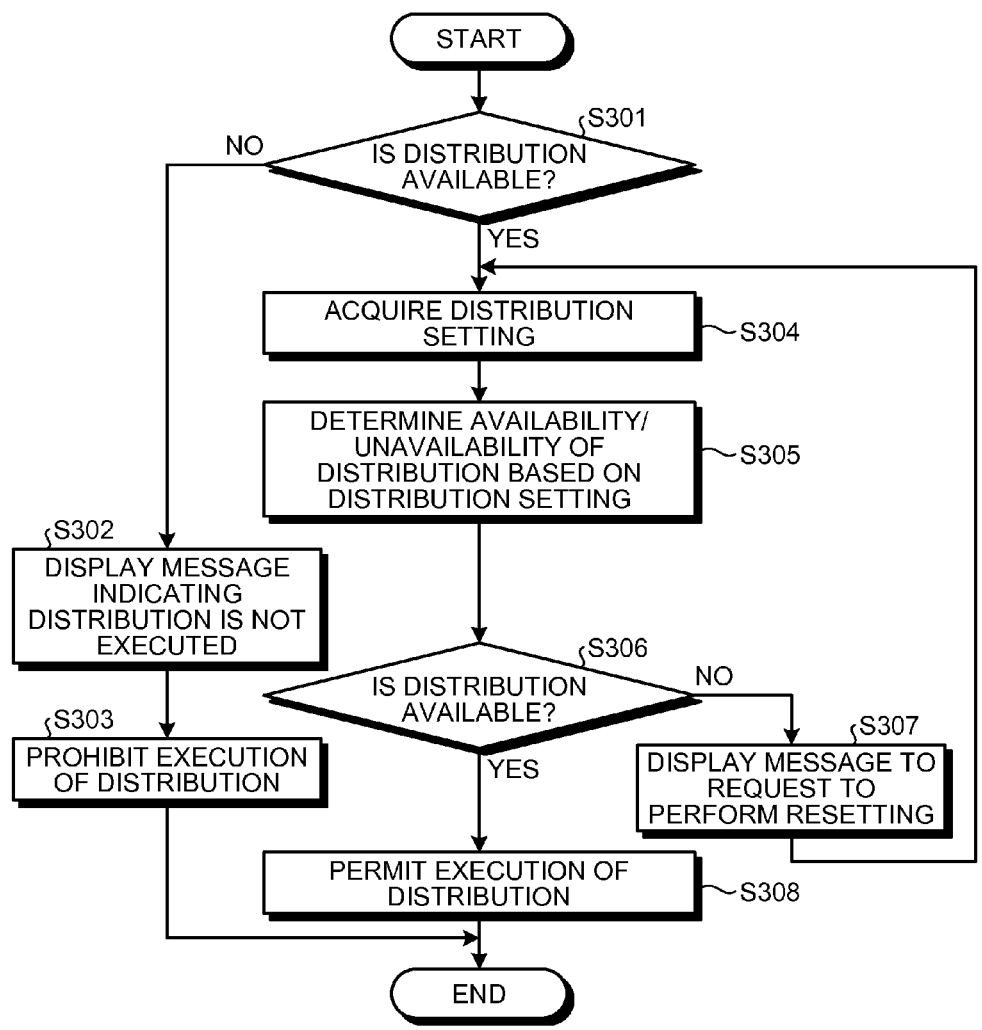

FIG.16

| ORGANI-ZATION ID | ORGANI-ZATION NAME | COUNTRY | LANGUAGE | SERVICE TO BE PROVIDED | | | COLLABORATION STORAGE INFORMATION | |
|---|---|---|---|---|---|---|---|---|
| | | | | DISTRIBUTION SERVICE | PRINT SERVICE | ... | | ... |
| XXX | ORGANI-ZATION A | JAPAN | JAPANESE | DISTRIBUTION SERVICE | SERVICE 1 | ... | STORAGE A | STORAGE B |
| YYY | ORGANI-ZATION B | U.S.A. | ENGLISH | DISTRIBUTION SERVICE | — | ... | STORAGE A | — |

FIG.17

| ORGANI-ZATION ID | USER ID | PASSWORD | ROLE | ADDRESS INFORMATION | STORAGE-A AUTHENTICATION INFORMATION | | STORAGE-B AUTHENTICATION INFORMATION | | ... |
|---|---|---|---|---|---|---|---|---|---|
| XXX | User A | AAA | ADMINIS-TRATOR | A@aaa.com | User a | aaa | User A | aa | |
| | User B | BBB | USER | B@aaa.com | User b | bbb | — | — | |
| | User C | CCC | USER | C@aaa.com | User C | ccc | — | — | |
| YYY | User A | AAA | ADMINIS-TRATOR | A@bbb.com | — | — | — | — | |
| | User D | DDD | USER | D@bbb.com | User d | ddd | — | — | |

FIG.18

| ORGANI-ZATION ID | DEVICE AUTHENTICATION INFORMATION | OFFICE INFORMATION | CAPABILITY | MACHINE NAME | ... |
|---|---|---|---|---|---|
| XXX | 111 | OFFICE A | A4 COLOR MACHINE | AA | |
| | 222 | OFFICE B | A2 COLOR MACHINE | BB | |
| | 333 | OFFICE B | A4 MONOCHROME MACHINE | CC | |
| YYY | 444 | – | A4 COLOR MACHINE | AA | |

# METHODS AND SYSTEMS FOR DISPLAYING A NUMBER OF SHEETS ALLOWED TO BE SAVED TO AN EXTERNAL STORAGE

CROSS-REFERENCE TO RELATED APPLICATIONS

The present application claims priority to and incorporates by reference the entire contents of Japanese Patent Application No. 2012-003508 filed in Japan on Jan. 11, 2012 and Japanese Patent Application No. 2012-272819 filed in Japan on Dec. 13, 2012.

BACKGROUND OF THE INVENTION

1. Field of the Invention

The present invention relates to an information processing system, a network system, and an information processing method.

2. Description of the Related Art

With the recent progress of a communication technology and a computer technology, the usage of a scanner (image reading device) is being enhanced. For example, there is a known system that connects a scanner, a distribution server, and a distribution destination device to a communication network, such as a local area network (LAN), and distributes image data generated by the scanner to the distribution destination device via the distribution server (Japanese Patent Application Laid-open No. 2005-094486).

In such a system, there is a known technique in which, when data is to be distributed from the scanner to a folder in a document management server, whether write access to the folder serving as a distribution destination is authorized or not is checked by using user information and write is allowed only when the write access is authorized (Japanese Patent Application Laid-open No. 2006-338210).

However, in the system described in Japanese Patent Application Laid-open No. 2006-338210, whether a distribution to the folder is available or not is determined only by checking the writeaccess. Therefore, in an actual distribution, a write failure may occur due to a capacity shortage of the folder in the distribution destination or due to a limitation on a file path name. Therefore, a user cannot recognize whether a distribution is actually performed until the distribution is performed.

Therefore, there is a need to allow a user to determine, when data is to be distributed to a distribution destination on a network, whether to perform a distribution before performing the distribution.

SUMMARY OF THE INVENTION

It is an object of the present invention to at least partially solve the problems in the conventional technology.

According to an embodiment, there is provided an information processing system that includes at least one information processing apparatus; a connecting unit configured to enable a connection with at least one device via a network; an acquiring unit configured to acquire attribute information on at least one distribution destination that is a destination of data to be distributed from the distribution destination, the distribution destination allowing a user to designate in the device; an output unit configured to output the acquired attribute information to the device via the network; and a distribution control unit configured to perform a process of distributing the data to the distribution destination designated by the user in the device after the attribute information is output to the device.

According to another embodiment, there is provided a network system that includes an information processing system including at least one information processing apparatus; and at least one electronic device. The electronic device includes a communicating unit configured to communicate with the information processing system via a network; a display unit; a transmitting unit configured to transmit data; and a requesting unit configured to issue, to the information processing system, a request to distribute the data. The information processing system includes a communicating unit configured to communicate with the electronic device via a network; an acquiring unit configured to acquire attribute information on at least one distribution destination that is a destination of data to be distributed from the distribution destination, the distribution destination allowing a user to designate in the device; an output unit configured to display the acquired attribute information on a display unit of the electronic device; and a distribution control unit configured to perform a process of distributing the data to the distribution destination designated by the use in the electronic device based on the request issued by the requesting unit of the electronic device after the attribute information is displayed on the display unit of the electronic device.

According to still another embodiment, there is provided an information processing method implemented by an information processing system that includes at least one information processing apparatus and that is connected to at least one device via a network. The information processing method includes acquiring attribute information on at least one distribution destination that is a destination of data to be distributed from the distribution destination, the distribution destination allowing a user to designate in the device; outputting the acquired attribute information to the device via the network; and performing a process of distributing the data to the distribution destination designated by the user in the device after the attribute information is output to the device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating a configuration example of a network system according to a first embodiment;

FIG. 2 is a block diagram illustrating an example of a hardware configuration of a scanner;

FIG. 6 illustrates examples of the attribute information to be output;

FIG. 7 is a functional block diagram for explaining a second example of the procedure for processing the attribute information;

FIG. 8 is a diagram illustrating an example of determination information;

FIG. 9 is a flowchart illustrating the second example of the procedure for processing the attribute information;

FIG. 10 is a diagram illustrating an example of a correspondence of a distribution setting with respect to an estimated capacity after a distribution and the available number of scanning sheets;

FIG. 11 is a flowchart illustrating a detailed procedure at a step for determining whether the distribution is available in the flowchart illustrated in FIG. 9;

FIG. 16 is a diagram illustrating an example of a data structure of organization management information;

FIG. 17 is a diagram illustrating an example of a data structure of user management information;

FIG. 18 is a diagram illustrating an example of a data structure of device management information.

DETAILED DESCRIPTION OF THE PREFERRED EMBODIMENTS

Figure 3:
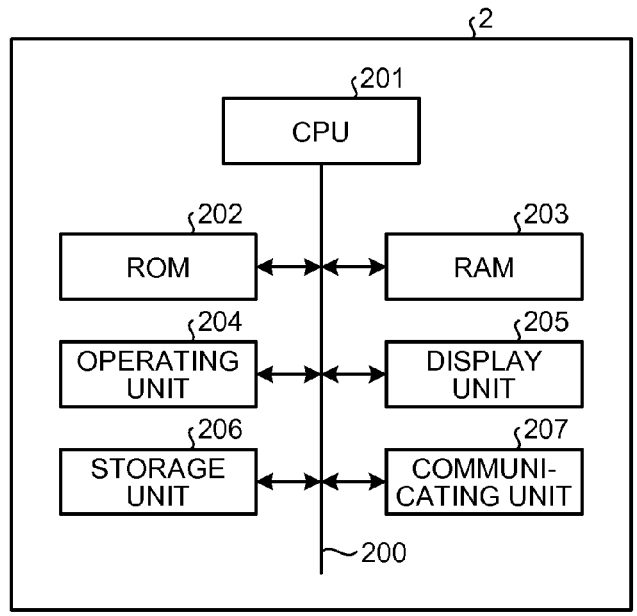
FIG. 3 is a block diagram illustrating an example of a hardware configuration of a distribution server.

Exemplary embodiments of the present invention will be explained in detail below with reference to the accompanying drawings.

First Embodiment

FIG. 1 is a diagram illustrating a configuration example of a network system according to a first embodiment. The network system includes a scanner 1, a distribution server 2, distribution destination devices 3-1 to 3-3, all of which are connected to a network NW, such as a local area network (LAN) or the Internet.

The distribution destination devices 3-1 to 3-3 serve as distribution destinations to which data is distributed. Hereinafter, any one of the distribution destination devices 3-1 to 3-3 is sometimes referred to as the distribution destination device 3 or the distribution destination devices 3-1 to 3-3 are sometimes collectively referred to as the distribution destination devices 3. The number of the distribution destination devices 3 is not limited to three.

In FIG. 1, the distribution destination device 3-1 is, for example, a storage device. When the storage device serves as a distribution destination, data is distributed to, for example, a folder in the storage device. In FIG. 1, the distribution destination device 3-2 is a printer. When the printer serves as a distribution destination, data is printed by the printer. In FIG. 1, the distribution destination device 3-3 is, for example, an electronic mail (e-mail) server. When the e-mail server serves as a distribution destination, data is distributed to, for example, an e-mail box in the e-mail server.

The scanner 1 is an information processing apparatus serving as a data distribution source. The scanner 1 may be a single function scanner or may be realized by installing a scanner application in a multi function peripheral (MFP). The information processing apparatus serving as the data distribution source is not limited to the scanner, and any device that can output data is applicable. For example, an information processing apparatus, such as a personal computer (PC), a mobile terminal, a projector, or an electronic blackboard, may be used as the data distribution source.

The distribution server 2 is an information processing apparatus that registers and manages the scanner 1 and the distribution destination devices 3-1 to 3-3 connected to the network NW. The distribution server 2 transmits and receives data to and from the devices and stores the data in a built-in memory (hard disk or the like) or transfers the data to a designated device together with an instruction on a processing content.

The distribution server 2 stores, in an internal memory, management information, such as addresses (IP addresses) of the distribution destination devices 3-1 to 3-3, needed to transfer image data. The distribution server 2 transfers the image data transmitted by the scanner 1 to the necessary distribution destination device 3 based on the management information.

Hardware Configuration of the Scanner

FIG. 2 is a block diagram illustrating an example of a hardware configuration of the scanner 1. As illustrated in FIG. 2, the scanner 1 includes a central processing unit (CPU) 101, a read only memory (ROM) 102, a random access memory (RAM) 103, an operating unit 104, a display unit 105, an image reading unit 106, a storage unit 107, and a communicating unit 108, all of which are connected to a bus 109.

The CPU 101 loads a program stored in the ROM 102 or the storage unit 107 by using the RAM 103 as a working area, and controls each of the units of the scanner 1.

The operating unit 104 includes various operation keys, such as numeric keys or a start key. The operating unit 104 performs, by the operation keys, various operations, such as setting of read information, a destination registration operation, or a password input operation, needed to operate the scanner 1. The display unit 105 displays various instruction contents input by the operating unit 104 or various types of information notified to a user by the scanner 1.

The image reading unit 106 reads an image of a document and generates image data. The image reading unit 106 includes, for example, an automatic document feeder (ADF) to separate a plurality of documents one by one and convey each of the documents to a document read position. The image reading unit 106 includes a light source, a photoelectric conversion element, and the like. The image reading unit 106 optically reads an image of a document conveyed by the ADF or a document set at the document read position by a user, and generates image data.

The storage unit 107 stores therein various types of information. The storage unit 107 is formed of, for example, a nonvolatile memory. The storage unit 107 stores therein destination information (IP addresses or the like) of the distribution destination devices 3 or authentication information (a user ID, a password, or the like) of a user of the scanner 1 for example. The communicating unit 108 transmits and receives information, such as image data, various commands, and communication control signals, to and from an external device, such as the distribution server 2.

Hardware Configuration of the Distribution Server

FIG. 3 is a block diagram illustrating an example of a hardware configuration of the distribution server 2. As illustrated in FIG. 3, the distribution server 2 includes a CPU 201, a ROM 202, a RAM 203, an operating unit 204, a display unit 205, a storage unit 206, and a communicating unit 207, all of which are connected to a bus 200.

The CPU 201 loads a program stored in the ROM 202 or the storage unit 206 by using the RAM 203 as a working area, and controls each of the units of the distribution server 2.

The operating unit 204 includes various operation keys. The operating unit 204 sets various types of information in the distribution server 2 by using the operation keys. The display unit 205 displays various types of information input via the operation keys or displays an operating state of the distribution server 2.

The storage unit 206 is formed of a hard disk device or the like. The storage unit 206 stores therein management information, such as destination information of the distribution destination devices 3-1 to 3-3, image data transmitted by the scanner 1 for transfer to the distribution destination devices 3, or the like. The communicating unit 207 transmits and receives information, such as image data, various commands, and communication control signals, to and from the scanner 1 and the distribution destination devices 3-1 to 3-3.

Procedure for Processing Attribute Information

In the network system illustrated in FIG. 1, a user of the scanner 1 gives an instruction to read a document and inputs address information or the like indicating a distribution destination by using the operating unit 104. Upon receiving input of the distribution destination, the distribution server 2 acquires attribute information on the designated distribution destination device 3. The attribute information is information indicating a data processing capability of the distribution destination device 3. For example, the attribute information corresponds to a remaining capacity of a data distribution destination (e.g., a free space of a folder, an e-mail box, or the like), an amount of remaining toner in a printer, a volume of data being processed, a processing capability of the CPU, or a traffic.

The acquired attribute information is displayed on the display unit 105 of the scanner 1. In this way, the display unit 105 functions as an output unit that outputs the attribute information. Therefore, the user can determine whether or not to perform a distribution before performing the distribution. Hereinafter, first to third examples of a procedure for processing the attribute information will be explained in order.

First Example of the Procedure for Processing the Attribute Information

Figure 4:
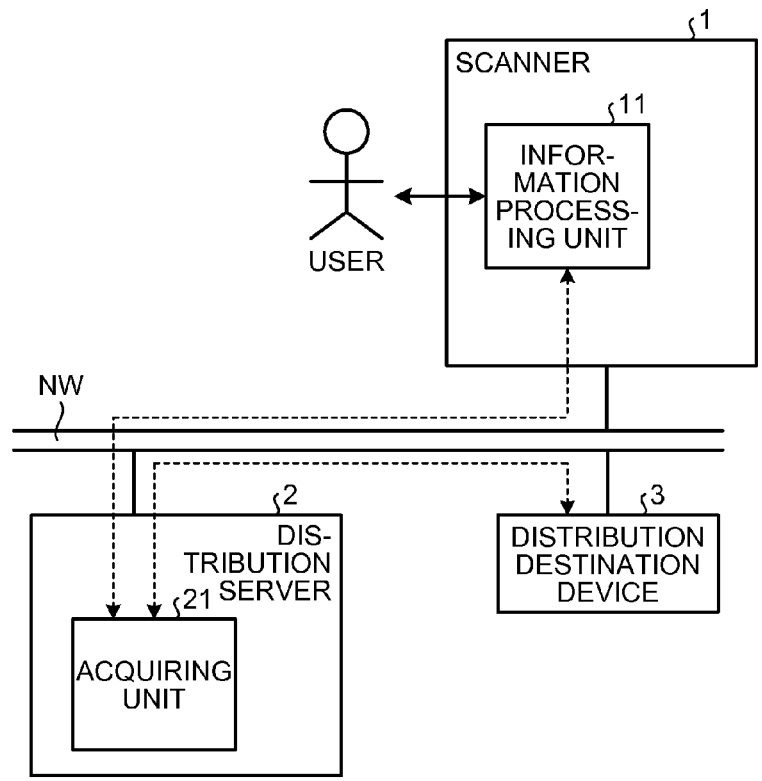
FIG. 4 is a functional block diagram for explaining a first example of a procedure for processing attribute information.
Figure 5:
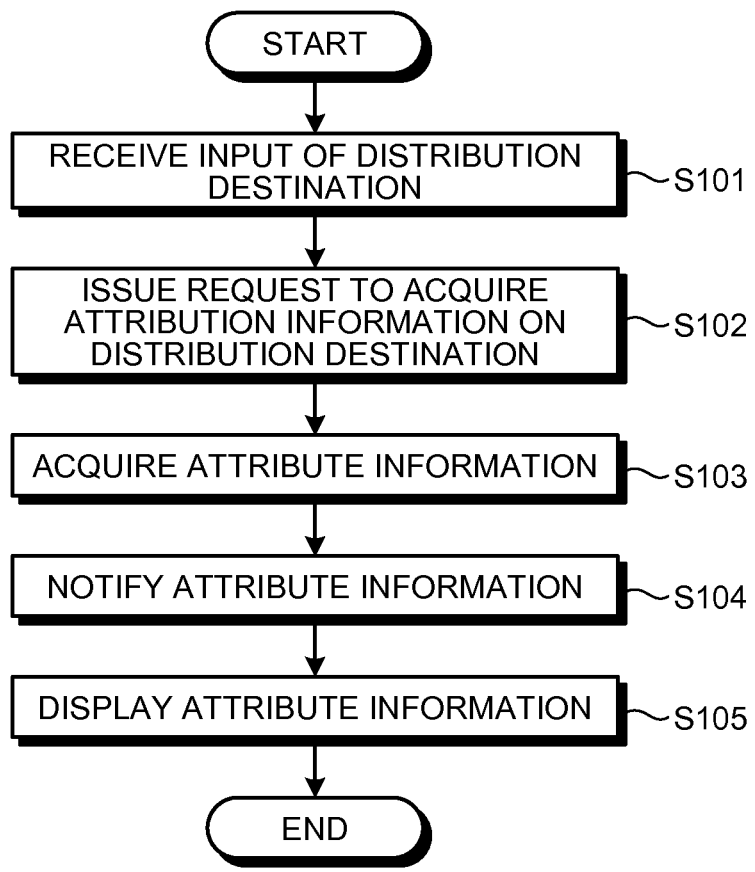
FIG. 5 is a flowchart illustrating the first example of the procedure for processing the attribute information.

FIG. 4 is a functional block diagram for explaining the first example of the procedure for processing the attribute information. FIG. 5 is a flowchart illustrating the first example of the procedure for processing the attribute information. The distribution destination device 3 illustrated in FIG. 4 correspond to the distribution destination device 3-1, the distribution destination device 3-2, or the distribution destination device 3-3 illustrated in FIG. 1.

As illustrated in FIG. 4, the scanner 1 includes an information processing unit 11. The distribution server 2 includes an acquiring unit 21. The functional blocks indicate functions to be realized by, for example, causing the CPU of each of the devices to execute a program stored in the ROM or the like by using the RAM as a working area. A part or the whole of the functional blocks may be realized by a hardware circuit.

When a user inputs a distribution destination via the operating unit 104 of the scanner 1, the operating unit 104 receives input of the distribution destination (Step S101 in FIG. 5). The information processing unit 11 issues a request to acquire the attribute information on the input distribution destination to the acquiring unit 21 of the distribution server 2 via the network NW (Step S102). The request contains, for example, destination information and acquisition information for specifying information to be acquired.

The acquiring unit 21 acquires the attribute information from the distribution destination device 3 based on the request (Step S103). The acquiring unit 21 notifies the information processing unit 11 of the scanner 1 of the acquired attribute information (Step S104). The information processing unit 11 displays the notified attribute information on the display unit 105 (Step S105). The method to output the attribute information is not limited to display on the display unit 105. Any method that can output the attribute information to a user is applicable. For example, the information processing unit 11 may output voice saying the attribute information to an output unit, such as a speaker (not illustrated).

FIG. 6 illustrates examples of the attribute information to be output. In (a) to (c) of FIG. 6, examples are illustrated in which the attribute information is displayed together with a distribution destination. Illustrated in (a) of FIG. 6 is an example, in which the address of a folder, a capacity of the folder, and authorization of write access are displayed. Illustrated in (b) of FIG. 6 is an example in which a name of a printer to be used, an amount of remaining toner, and the number of documents are displayed. Illustrated in (c) of FIG. 6 is an example in which the address of an e-mail box and a capacity of the e-mail box are displayed.

A user of the scanner 1 can determine whether a distribution is available or not (whether to perform a distribution) based on the attribute information, such as the capacity of the folder, the amount of remaining toner, or the capacity of the e-mail box, corresponding to the size of data that can be processed by each of the distribution destinations.

While an example has been explained above, in which the functions are separated into the scanner 1 and the distribution server 2, the functions provided in each of the devices may be provided in any of the devices. For example, while the acquiring unit 21 is provided in the distribution server 2, the acquiring unit 21 may be provided in the scanner 1 to directly acquire the attribute information.

Second Example of the Procedure for Processing the Attribute Information

FIG. 7 is a functional block diagram for explaining the second example of the procedure for processing the attribute information. FIG. 9 is a flowchart illustrating the second example of the procedure for processing the attribute information. FIG. 11 is a flowchart illustrating a detailed procedure at a step for determining whether the distribution is available in the flowchart illustrated in FIG. 9. In FIG. 7, functional blocks that are the same as or corresponding to the functional blocks illustrated in FIG. 4 are denoted by the same reference numerals as those in FIG. 4.

As illustrated in FIG. 7, a scanner 1-2 of the second example includes the information processing unit 11, a determining unit 12, and a distribution control unit 13. The scanner 1-2 stores therein determination information 14. The distribution server 2 includes the acquiring unit 21.

Specifically, the scanner 1-2 of the second example includes the determining unit 12 and the distribution control unit 13 in addition to the functional blocks of the scanner 1 of the first example (FIG. 4), and is provided with the determination information 14 as information to be used.

The determining unit 12 determines whether a data distribution to a distribution destination is available or not based on the acquired attribute information. When the determining unit 12 determines that the data distribution is available, the distribution control unit 13 controls the data distribution to the distribution destination. The determination information 14 is input by a user via the operating unit 104 in advance and stored in, for example, the storage unit 107.

FIG. 8 is a diagram illustrating an example of the determination information 14. As illustrated in FIG. 8, the determination information 14 is set for each of the distribution destinations. For example, the determining unit 12 determines whether a data distribution is available or not for each of the distribution destinations by referring to the determination information 14 as illustrated in FIG. 8. In the example illustrated in FIG. 8, if the distribution destination is a folder (distribution to a folder), the determining unit 12 determines that the distribution is unavailable when the remaining capacity of the folder is equal to or smaller than a threshold (xx MB), and determines that the distribution is available when the remaining capacity of the folder exceeds the threshold (performs the distribution). When the distribution destination is a printer (distribution for printing), the determining unit 12 determines that the distribution is unavailable when no toner is remained (does not perform the distribution), and determines that the distribution is available when the toner is remained. When the distribution destination is an e-mail box (e-mail distribution), the determining unit 12 determines that the distribution is unavailable when the remaining capacity of the e-mail box is equal to or smaller than a threshold (xx MB), and determines that the distribution is available when the remaining capacity of the e-mail box exceeds the threshold.

The second example of the procedure for processing the attribute information illustrated in FIG. 9 will be explained below. Step S201 to Step S204 are the same as Step S101 to Step S104 in FIG. 5, respectively; therefore, explanation thereof will be omitted.

The information processing unit 11 sends the notified attribute information to the distribution control unit 13, and sends a query about the availability/unavailability of the distribution. The distribution control unit 13 acquires the determination information 14 corresponding to the distribution destination from the storage unit 107 (Step S205). The determining unit 12 determines the availability/unavailability of the distribution based on the attribute information and the determination information 14 (Step S206). The details at Step S206 will be explained later.

When it is determined that the distribution is available (YES at Step S206), the distribution control unit 13 permits execution of the distribution (Step S207). When it is determined that the distribution is unavailable (NO at Step S206), the distribution control unit 13 prohibits execution of the distribution (Step S208). The information processing unit 11 displays the notified attribute information on the display unit 105 (Step S209).

Therefore, in the distribution process with respect to the folder for example, it is possible to control execution of the distribution by prohibiting the execution of the distribution when the capacity of a distribution folder is equal to or smaller than a predetermined value.

In FIG. 9, the information processing unit 11 may display a notice indicating whether to execute the distribution, when displaying the attribute information. When the capacity is used to control the distribution, the determining unit 12 may further determine the availability/unavailability of the distribution based on distribution setting information provided by a user (hereinafter, described as a distribution setting), and the information processing unit 11 may display a determination result for example. The distribution setting is information indicating a setting of a distribution method. The distribution setting corresponds to a data format of data to be distributed, a size of the data, or resolution of the data.

For another example, the information processing unit 11 may display or control the available number of scanning sheets based on the distribution setting. FIG. 10 is a diagram illustrating an example of a correspondence of the distribution setting with respect to an estimated capacity after a distribution and the available number of scanning sheets.

For example, when the distribution setting formed of a tiff monochrome format, A3 size, and resolution of 200 dpi is specified, when the estimated file size is 50 KB (kilobytes) per sheet, and when the remaining capacity for the distribution before the limit value is reached is 10 MB (megabytes), the determining unit 12 determines that the available number of scanning sheets is 20. The information processing unit 11 may display the above determination result on the display unit 105.

The details at Step S206, together with Step S207 and S208, will be explained below with reference to FIG. 11. FIG. 11 is a flowchart illustrating an example of the details at Step S206 to Step S208.

The determining unit 12 compares the attribute information and the determination information, and determines the availability/unavailability of the distribution based on a comparison result (Step S301). Specifically, for example, the determining unit 12 determines that the distribution is available when the remaining capacity of the folder exceeds a set threshold (xx MB) and determines that the distribution is unavailable when the remaining capacity is equal to or smaller than the threshold.

When it is determined that the distribution is unavailable (NO at Step S301), the information processing unit 11 displays, on the display unit 105, a message indicating that the distribution is not executed (Step S302). The distribution control unit 13 prohibits execution of the distribution (Step S303).

On the other hand, when determining that the distribution is available (YES at Step S301), the determining unit 12 further acquires a distribution setting set by the user (Step S304). The determining unit 12 compares the acquired distribution setting and the determination information 14, and determines the availability/unavailability of the distribution (Step S305). Specifically, for example, the determining unit 12 calculates the size of a file to be distributed based on the distribution setting, determines that the distribution is unavailable when the capacity of the folder after the distribution is equal to or smaller than the threshold of the remaining capacity of the folder, and determines that the distribution is available when the remaining capacity of the folder after the distribution exceeds the threshold.

When the determination result indicates that the distribution is unavailable (NO at Step S306), the information processing unit 11 displays, on the display unit 105, a message to request the user to perform resetting in order to urge the user to change the distribution setting (Step S307). Thereafter, the process returns to Step S304. When the determination result indicates that the distribution is available (YES at Step S306), the distribution control unit 13 permits execution of the distribution (Step S308).

At Step S304, it may be possible to cause the determining unit 12 to perform the following process in parallel, that is, a process of acquiring a user input value (for example, a file name) together with the distribution setting, determining whether the file length is equal to or shorter than a defined value, determining that the distribution is available when the file length is equal to or shorter than the defined value, and determining that the distribution is unavailable when the file length exceeds the defined value.

Third Example of the Procedure for Processing the Attribute Information

Figure 12:
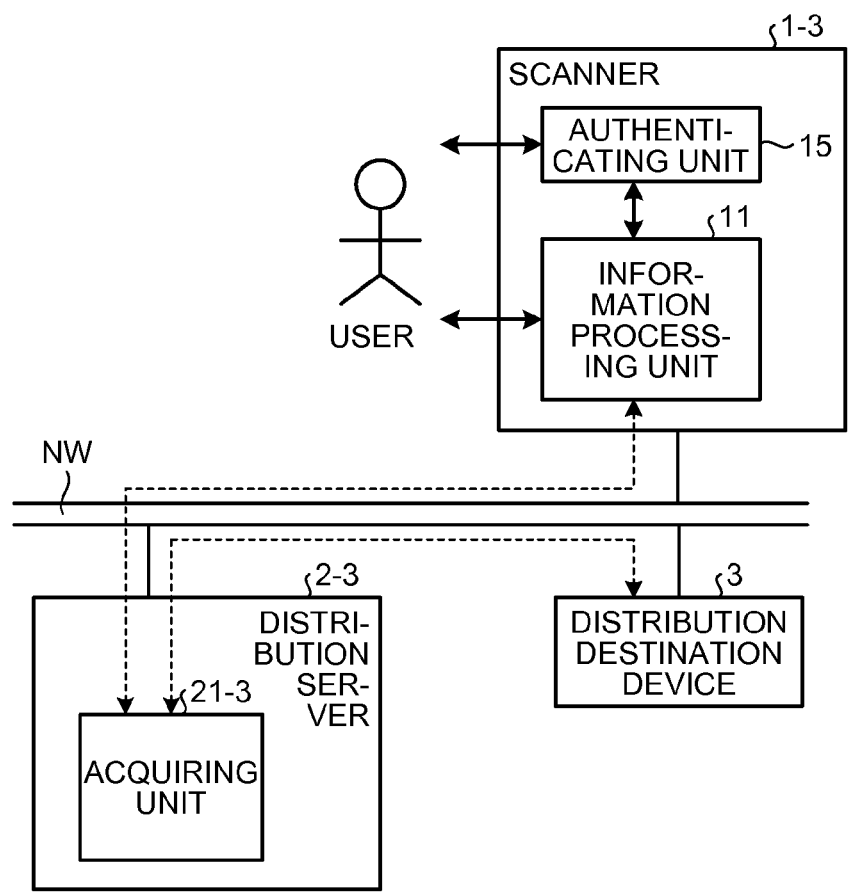
FIG. 12 is a functional block diagram for explaining a third example of the procedure for processing the attribute information.
Figure 13:
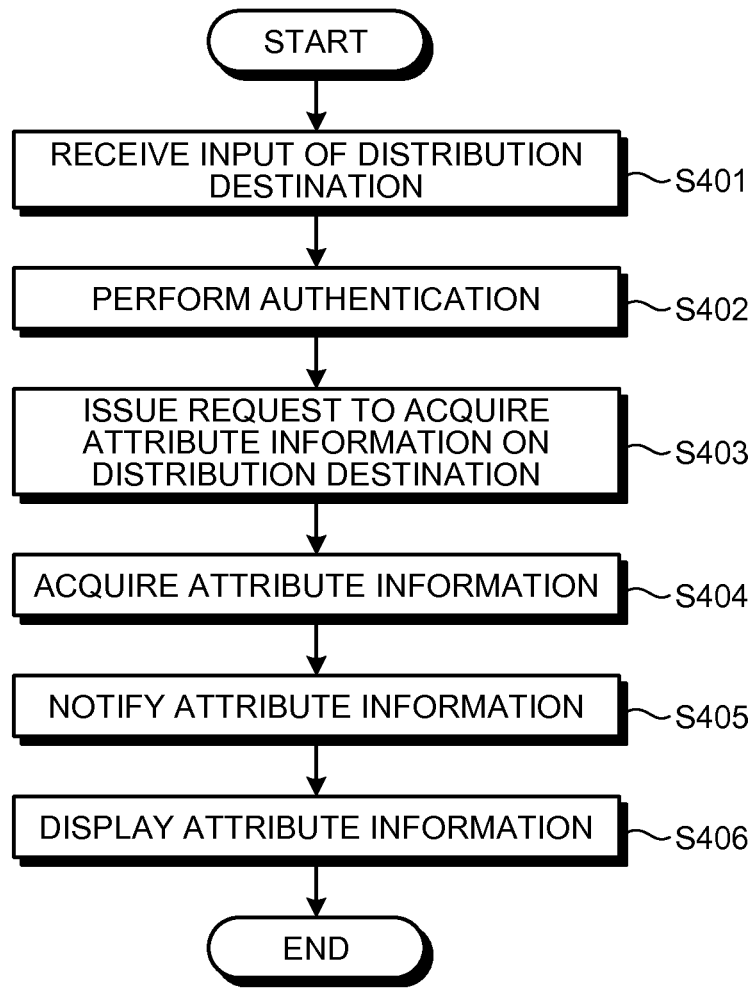
FIG. 13 is a flowchart illustrating the third example of the procedure for processing the attribute information.

FIG. 12 is a functional block diagram for explaining the third example of the procedure for processing the attribute information. FIG. 13 is a flowchart illustrating the third example of the procedure for processing the attribute information.

The functional blocks that are the same as or corresponding to the functional blocks illustrated in FIG. 4 are denoted by the same reference numerals as those in FIG. 4.

As illustrated in FIG. 12, a scanner 1-3 of the third example includes the information processing unit 11 and an authenticating unit 15. A distribution server 2-3 of the third example includes an acquiring unit 21-3. Specifically, the functional blocks are formed by adding the authenticating unit 15 to the functional blocks of the scanner 1 illustrated in FIG. 4. The authenticating unit 15 performs authentication of a user based on authentication information (a user ID, a password, or the like). The acquiring unit 21-3 acquires the attribute information associated with the user by using the authentication information of the authenticated user.

The third example of the procedure for processing the attribute information illustrated in FIG. 13 will be explained below. Step S401 is the same as Step S101 in FIG. 5; therefore, explanation thereof will be omitted.

The authenticating unit 15 performs authentication based on the authentication information (a user ID, a password, or the like) input by the user via the operating unit 104 (Step S402), and sends the authentication information to the information processing unit 11.

The information processing unit 11 issues a request to acquire the attribute information to the acquiring unit 21-3 (Step S403). At this time, the information processing unit 11 transmits the authentication information of the user together with the request to acquire the attribute information. The acquiring unit 21-3 acquires the attribute information associated with the user by using the request and the authentication information of the user (Step S404). For example, the acquiring unit 21-3 acquires, as the attribute information, the remaining capacity of a folder defined for each user or the remaining capacity of an e-mail box used by the user. The acquiring unit 21-3 notifies the information processing unit 11 of the acquired information (Step S405). The information processing unit 11 displays the notified attribute information on the display unit 105 (Step S406). Through the above processes, it is possible to acquire the attribute information associated with the user.

In the embodiment described above, a scanner is employed as a device (distribution source) that distributes image data. However, the device that distributes image data or the like may be a digital camera or a PC that transmits image data stored in a memory card.

Second Embodiment

In the first embodiment, an example has been explained in which the distribution server acquires the attribute information. However, the distribution server does not necessarily have to be physically a single device. For example, the distribution server may be formed of one or more physical devices on a network, such as a cloud. In a second embodiment, an example will be explained in which an information processing system formed of one or more information processing apparatuses has a function of a distribution server. In the second embodiment, various electronic devices (a PC, a mobile terminal, and an image forming apparatus) distribute data to the information processing system serving as a distribution destination.

Figure 14:
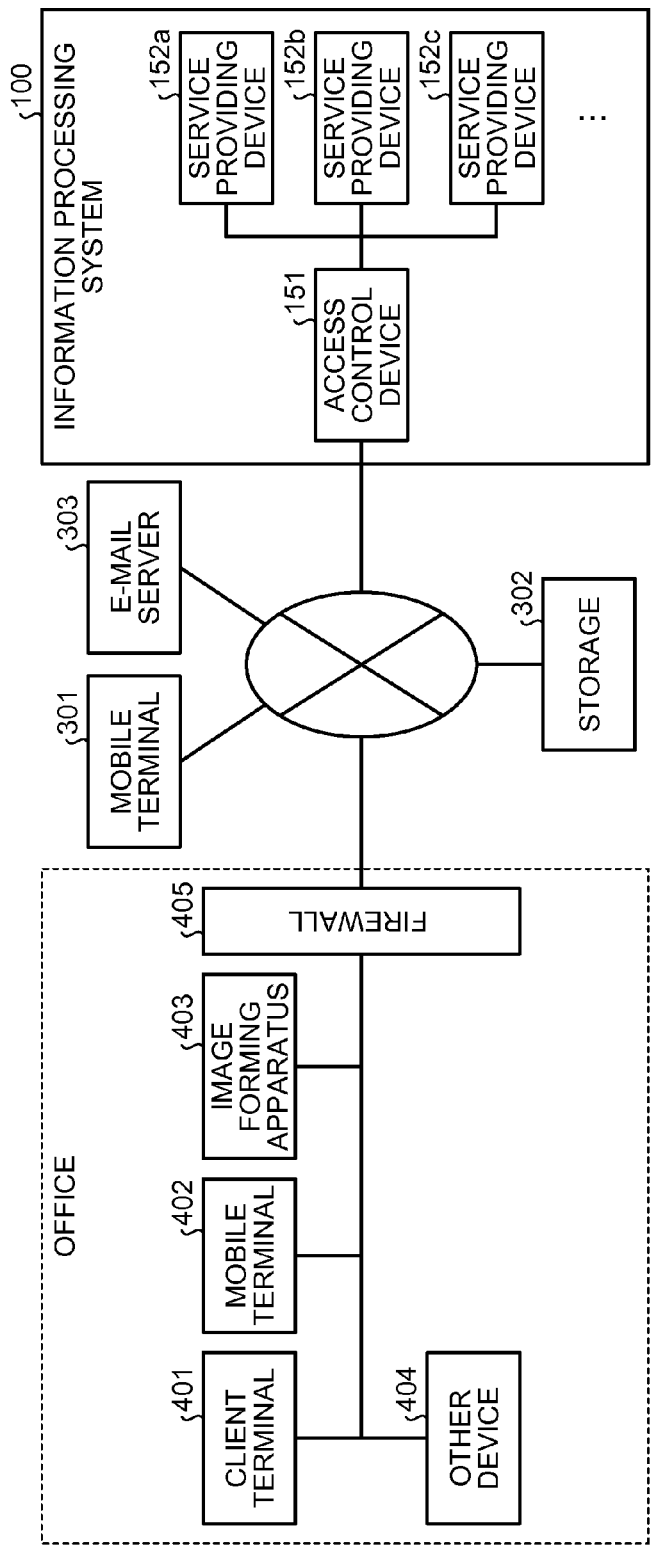
FIG. 14 is a diagram illustrating a configuration example of a network system according to a second embodiment.

FIG. 14 is a diagram illustrating a configuration example of a network system according to the second embodiment. As illustrated in FIG. 14, the network system according to the second embodiment includes a plurality of electronic devices (a client terminal 401, a mobile terminal 402, an image forming apparatus 403, other device 404, and a mobile terminal 301), a firewall 405, an information processing system 100, a storage 302, and an e-mail server 303. All of the devices are connected to one another in a communicable manner via a wired or wireless network.

The client terminal 401 is an information processing apparatus, such as a PC, used by a user. The mobile terminal 402 is an information processing apparatus, such as a mobile phone, a smartphone, and a tablet terminal, that is portable for use by the user. The image forming apparatus 403 is a device, such as an MFP, a copier, a scanner, or a printer, that forms an image. The electronic devices are not limited to the devices illustrated in FIG. 14, and any device that can serve as a data distribution destination may be employed. The number of each of the electronic devices is not limited to one.

The firewall 405 is a device that prevents fraudulent access to electronic devices in an office over a network (the Internet or the like). The electronic device that serves as the distribution destination is not limited to a device in the office (inside the firewall). A device outside the firewall (in FIG. 14, the mobile terminal 301) may be used as the distribution destination.

The information processing system 100 is a system having a function of the distribution server as described above. The storage 302 is a storage device that serves as a data distribution destination. For example, an electronic device that distributes data can request the information processing system 100 to use the storage 302 as the distribution destination. In this case, the information processing system 100 distributes (stores) data, the distribution of which has been requested, to (in) the storage 302.

The e-mail server 303 is a server device that controls transmission and reception of an e-mail. The e-mail server 303 corresponds to, for example, the distribution destination device 3-3 according to the first embodiment. The e-mail server 303 can serve as a data distribution destination.

The information processing system 100 includes an access control device 151 and service providing devices 152a to 152c.

The access control device 151 is an information processing apparatus that manages provision of various services. In FIG. 14, one access control device 151 is illustrated. However, a plurality of the access control device 151 may be provided. The service providing devices 152a to 152c are information processing apparatuses that provide various services, such as a distribution service or a print service. The distribution service is a service corresponding to the functions of the distribution server of the first embodiment. Hereinafter, any one of the service providing devices 152a to 152c is sometimes referred to as the service providing device 152 or the service providing devices 152a to 152c are sometimes collectively referred to as the service providing devices 152. The number of the service providing devices 152 is not limited to three.

The access control device 151 and the service providing devices 152 correspond to one or more information processing apparatuses included in the information processing system 100. It may be possible to provide the functions of the access control device 151 and the service providing devices 152 in a physically single information processing apparatus. Specifically, it is sufficient that the information processing system 100 including one or more information processing apparatuses has the functions corresponding to the access control device 151 and the service providing devices 152.

Figure 15:
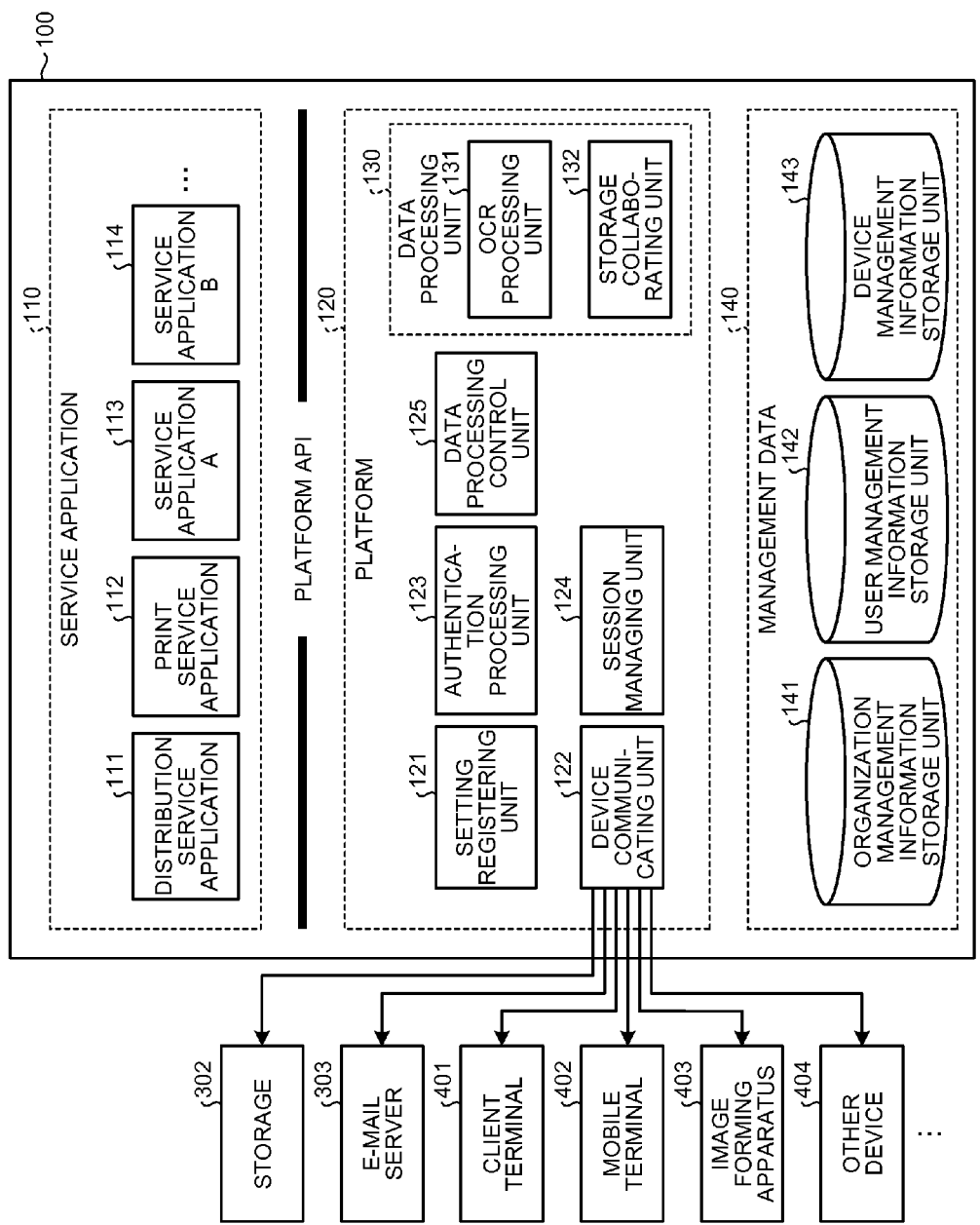
FIG. 15 is a block diagram illustrating a functional configuration example of an information processing system.

FIG. 15 is a block diagram illustrating a functional configuration example of the information processing system 100.

As illustrated in FIG. 15, the information processing system 100 includes a service application 110, a platform 120, and management data 140.

The service application 110 is an application (program) for providing a service, such as the distribution service or the print service as described above. In FIG. 15, an example is illustrated in which a distribution service application 111, a print service application 112, a service application A 113, and a service application B 114 are provided.

The distribution service application 111 is an application having the same functions as those of the distribution server described above. Specifically, for example, the distribution service application 111 has the same functions as those of the acquiring unit 21 of the distribution server 2 illustrated in FIG. 4. The print service application 112 is an application for printing (printing out) data transmitted by an electronic device. The service application A 113 and the service application B 114 are other arbitrary applications.

Each of the applications can use the functions of each of units of the platform 120 by using a platform API (application programming interface) published by the platform 120.

The platform 120 has functions commonly used by all of the applications. As examples of the functions, the platform 120 includes a setting registering unit 121, a device communicating unit 122, an authentication processing unit 123, a session managing unit 124, a data processing control unit 125, and a data processing unit 130.

The setting registering unit 121 performs a process of registering setting information, such as the management data 140. The device communicating unit 122 controls communication with an external device, such as an electronic device. The authentication processing unit 123 performs a process of authenticating a user of the external device. The session managing unit 124 manages a communication session with the external device. The data processing control unit 125 controls data processing performed by the data processing unit 130 in accordance with a request issued by the external device.

The data processing unit 130 performs data processing corresponding to a request. The data processing unit 130 includes an optical character reader (OCR) processing unit 131 and a storage collaborating unit 132. The OCR processing unit 131 performs, for example, a character recognition process on the data transmitted by the external device. The storage collaborating unit 132 controls transmission and reception of the data to and from an online storage (the storage 302 or the like) on a network. The data processing is not limited to an OCR process or a storage collaboration process.

The management data 140 is data to be referred to in various processes performed by the information processing system 100. In the example illustrated in FIG. 15, the management data 140 is stored in an organization management information storage unit 141, a user management information storage unit 142, and a device management information storage unit 143.

The organization management information storage unit 141 stores therein management information (organization management information) for managing organizations that use services provided by the information processing system 100. FIG. 16 is a diagram illustrating an example of a data structure of the organization management information. As illustrated in FIG. 16, the organization management information contains an organization ID, an organization name, a country, a language, a provided service, and information on collaborating storages.

The organization ID is information for identifying an organization. The organization means an aggregate (group) of users or electronic devices. For example, the organization corresponds to a company, a department in the company, or an aggregate of users or electronic devices using a service (a group of users or electronic devices for which a service contract is made). The provided service indicates a service that can be provided to the organization identified by the organization ID. The collaborating storage information is information for specifying a storage that can be designated (that can collaborate) as a distribution destination of the data.

The user management information storage unit 142 stores therein management information (user management information) for managing a user of the information processing system 100. FIG. 17 is a diagram illustrating an example of a data structure of the user management information. As illustrated in FIG. 17, the user management information contains an organization ID, a user ID, a password, a role, address information, authentication information for a storage A, and authentication information for a storage B.

The user ID is information for identifying a user. A password is not always necessary. The user ID may be any of pieces of information (a card ID, a serial number of a device, a phone number of a mobile phone, or profile information of a device) for identifying an electronic medium (an IC card, a mobile phone, a tablet terminal, or an electronic book) carried by a user or may be a combination of the above pieces of information. It is sufficient that a user can be uniquely identified by the organization ID and the user ID. For example, it is possible to set the same user ID if the organization ID is different.

The address information is, for example, an e-mail address for using the e-mail server 303. The authentication information for the storage A and the authentication information for the storage B (hereinafter, they may be simply referred to as the storage authentication information) are information used for access authentication for a collaborating storage (for example, the storage 302). The storage authentication information is set when a storage is designated as the distribution destination of the data. In FIG. 17, an example is illustrated in which the storage authentication information contains a user ID (for example, "User a") and a password (for example, "aaa") used for the access authentication for each of the storages.

The device management information storage unit 143 stores therein management information (device management information) for managing an electronic device connected to the information processing system 100. FIG. 18 is a diagram illustrating an example of a data structure of the device management information. As illustrated in FIG. 18, the device management information contains an organization ID, device authentication information, office information, a capability, and a machine name.

The device authentication information is information for authenticating the electronic device connected to the information processing system 100. For example, the device authentication information may be an ID indicating that a specific application is installed in the electronic device, a device number indicating a specific electronic device, or the like. For example, when receiving a request to provide a service, the information processing system 100 checks whether the device authentication information (device number or the like) of the electronic device serving as a request source matches the device authentication information contained in the device management information, to thereby determine whether the electronic device serving as the request source is a device that is permitted to provide the service. The functional configuration example of the information processing system 100 is not limited to the above example. The service application may include at least a part of the functions of the platform.

Figure 19:
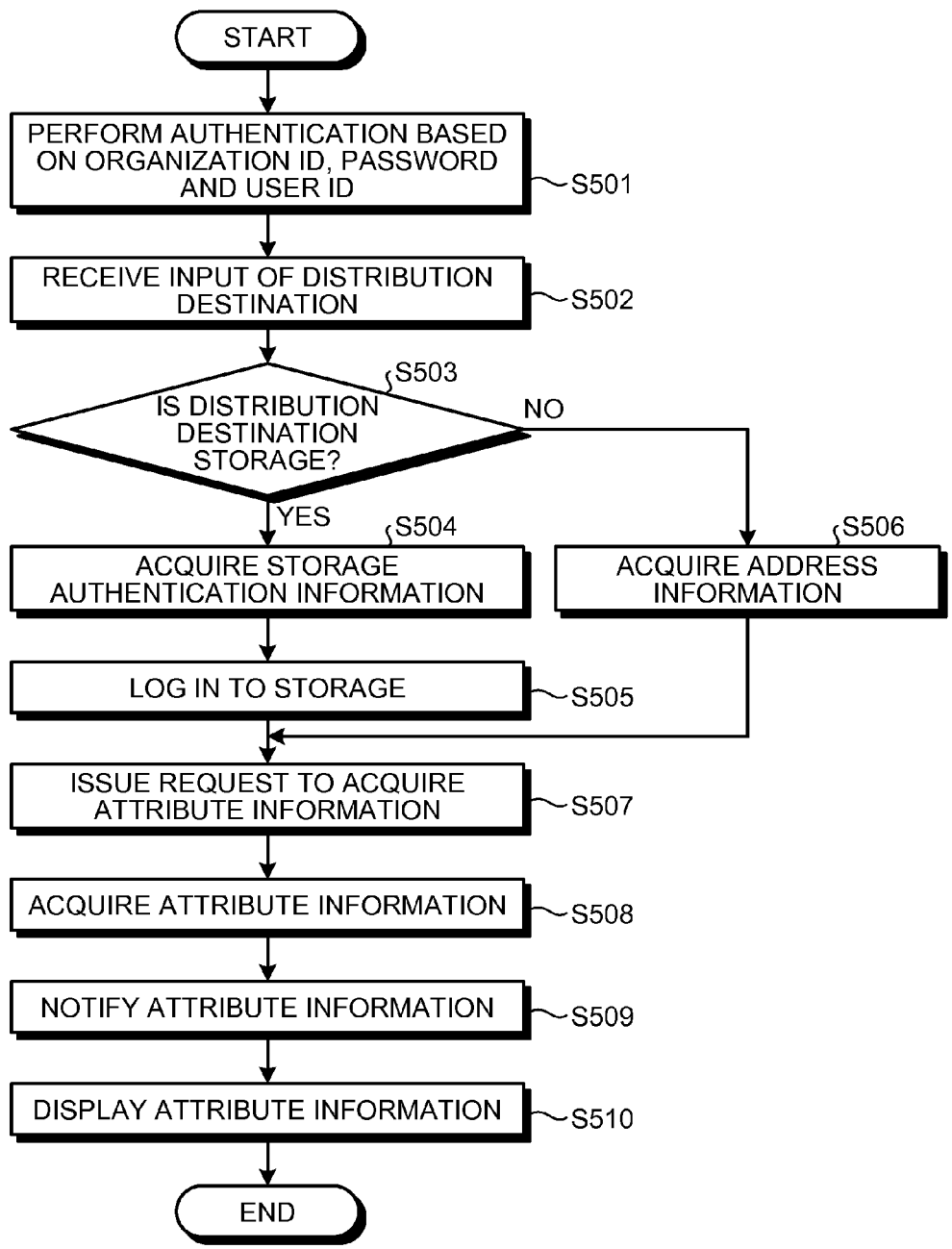
FIG. 19 is a flowchart illustrating an example of a procedure for processing attribute information according to the second embodiment.

An example of the procedure for processing the attribute information performed by the information processing system 100 configured as above according to the second embodiment will be explained below with reference to FIG. 19. FIG. 19 is a flowchart illustrating an example of the procedure for processing the attribute information according to the second embodiment. In FIG. 19, an example will be explained in which either a storage (for example, the storage 302) or an e-mail server (for example, the e-mail server 303) can be designated as the distribution destination. However, the distribution destination is not limited to this example.

When the information processing system 100 receives, via the device communicating unit 122, a user ID and a password that a user has input in an electronic device and the organization ID and the device authentication information stored in the electronic device, the information processing system 100 causes the authentication processing unit 123 to perform login authentication (Step S501). Specifically, the information processing system 100 compares the user ID, the password, and the organization ID received from the electronic device with a combination of the organization ID, the user ID, and the password stored in the user management information storage unit 142, to thereby determine success or failure of user authentication. Furthermore, the information processing system 100 compares the organization ID and the device authentication information received from the electronic device with a combination of the organization ID and the device authentication information stored in the device management information storage unit 143, to thereby determine success or failure of device authentication. When the user authentication is successful and the device authentication is successful, the electronic device can log into the information processing system 100. It is also possible to specify a provided service associated with the received organization ID, and use the associated provided service. In the example in FIG. 16, if the organization ID is "XXX", the distribution service and the print service are available, and, if the organization ID is "YYY", the distribution service and the service 1 are available.

Subsequently, when the user selects the distribution service from a list of the provided services and designates a distribution destination of electronic data, such as scanned image data or document data, the distribution service application 111 receives input of the distribution destination designated by the user via the device communicating unit 122 (Step S502). The distribution service application 111 determines whether the designated distribution destination is the storage or not (Step S503). When the distribution destination is the storage (Yes at Step S503), the distribution service application 111 acquires the storage authentication information associated with the authenticated user from the user management information storage unit 142 (Step S504). The distribution service application 111 may acquire the storage authentication information from the user management information storage unit 142 when the designated storage is permitted to serve as the distribution destination for the authenticated user (the organization to which the user belongs). Whether the designated storage is permitted to serve as the distribution destination can be determined by, for example, referring to the collaborating storage information contained in the organization management information.

The distribution service application 111 performs login (access authentication) to the designated storage by using the acquired storage authentication information (Step S505). For example, the distribution service application 111 causes the storage collaborating unit 132 to perform a process of logging into the storage. When the login is successful, the process proceeds to Step S507. When the login fails, an error message is transmitted to the electronic device serving as the request source for example, although not illustrated, and the process ends.

At Step S503, when it is determined that the distribution destination is not the storage (No at Step S503), that is, when the distribution destination is the e-mail server, the distribution service application 111 acquires the address information from the user management information storage unit 142 (Step S506).

When the login to the storage is successful (Step S505) or when the address information used for the e-mail server is acquired (Step S506), the distribution service application 111 issues a request to acquire the attribute information to the distribution destination (Step S507).

For example, when the distribution destination is the storage 302, the storage 302 returns, as the attribute information, the remaining capacity of a folder allocated to the authenticated user to the distribution service application 111. For example, when the distribution destination is the e-mail server 303, the e-mail server 303 returns, as the attribute information, the remaining capacity of an e-mail box allocated to an e-mail address (the address information) of the user (the user of the electronic device serving as the request source), who has sent the request for the attribute information, to the distribution service application 111.

The distribution service application 111 acquires the attribute information returned by the distribution destination (Step S508). The distribution service application 111 notifies the electronic device serving as the request source of the acquired attribute information (Step S509). The electronic device serving as the request source displays the notified attribute information on a display unit or the like (Step S510).

In this way, according to the second embodiment, even when the information processing system including one or more information processing apparatuses has the functions of the distribution server (the distribution service), a user can determine whether or not to perform a distribution before performing the distribution when the data is to be distributed to the distribution destination on a network.

It may be possible to acquire the attribute information on the distribution destination when the login to the information processing system 100 is successful, the user selects the distribution service from the list of the provided services, and the information processing system 100 receives a request to use the distribution service. At this time, the distribution service application 111 uses the functions of the platform 120 to acquire the attribute information on the distribution destination associated with the authenticated user from all of the storages and the e-mail servers associated with the authenticated user by using the collaborating storage information and the address information. As a response to the request to use the distribution service, a distribution setting screen containing the attribution information on each of the distribution destinations is transmitted to the electronic device, so that the user can check the attribute information on each of the distribution destinations when setting a distribution destination of the electronic data.

The attribute information on a distribution destination does not necessarily have to be acquired when the user sends a request to use the distribution service. It may be possible to periodically acquire the attribute information and store the attribute information in a storage unit (for example, in the user management information storage unit 142) of the information processing system 100. With this configuration, it becomes possible to provide the attribute information stored in the information processing system to the electronic device. Therefore, while the currency of the attribute information may be lowered, the response speed to the electronic device can be improved.

Furthermore, as explained in the second example of the first embodiment, it may be possible to cause the distribution service application 111 to perform a process of determining the availability/unavailability of a distribution to the distribution destination designated by the user based on a threshold (the determination information), the attribute information, and the like.

It may also be possible to give a notice to an administrator when the remaining capacity (attribute information) becomes equal to or smaller than the threshold, instead of determining the availability/unavailability of the distribution. Furthermore, it may be possible to give a notice to the administrator in addition to the determination of the availability/unavailability of the distribution.

When a data distribution to the designated distribution destination is not performed based on the determination of the availability/unavailability of the distribution, it may be possible to notify the electronic device, which has issued a request for the data distribution, of a notice indicating that the data distribution is not performed. It may also be possible to display, on the electronic device, a message indicating a reason why the distribution is not performed, for example, "a distribution is not performed because the remaining capacity of the distribution destination is equal to or smaller than the threshold".

When the data distribution to the designated distribution destination is not performed, and if there is another distribution destination selectable by the user, it may be possible to display a selection screen to allow the user to select whether or not to distribute data to another distribution destination. At this time, whether another distribution destination is selectable or not is determined based on the threshold and the attribute information, and whether the selection screen is displayed or not is determined based on whether another selectable distribution destination is present based on the determination result. When it is determined that the selection screen is displayed, the selection screen is displayed on the electronic device, and, when it is determined that the selection screen is not displayed, a message as described above or the like may be displayed on the electronic device.

It may be possible to perform determination based on the amount of data currently used by a user (the usage), instead of based on the remaining capacity. For example, it may be possible to set a threshold of the usage of the storage A to 10 MB (megabytes), and determine the availability/unavailability of the distribution or determine whether or not to give a notice to an administrator based on whether user's data usage (attribute information) acquired from the storage exceeds the threshold or based on whether the data usage will exceed the threshold by the distribution of electronic data.

When the distribution destination selected by the user is a storage shared by an organization for example, it may be possible to display a total data usage used by the organization (by all of users associated with one organization ID) or use the total data usage as a threshold, instead of the data usage used by each of the users. In this case, for example, if a shared storage is registered in the collaborating storage information of the organization management information and the information processing system has authentication information on login to the shared storage, all of the users associated with the organization ID can designate the shared storage as the distribution destination. The authentication information on login to the shared storage may be managed as the user management information.

In some cases, one organization may have a plurality of organization IDs. For example, in a company A, a head office in Japan has one organization ID "XXX1" and a branch office in the United States of America has another organization ID "XXX2". In this case, the information processing system may manage the organization IDs "XXX1" and "XXX2" by using a group ID "XXXG" in the organization management information storage unit 141 and enable to use a storage, as a distribution destination, associated with any of the organization IDs belonging to the same group ID. With this configuration, for example, a user associated with the organization ID "XXX1" can check the attribute information on a storage associated with the organization ID "XXX2" on a screen and designate the storage as a data distribution destination.

The program executed by the devices of the above embodiments is provided by being incorporated in a ROM or the like in advance.

The program executed by the devices of the above embodiments may be provided as a computer program product by being recorded in a computer-readable recording medium, such as a CD-ROM, a flexible disk (FD), a CD-R, or a Digital Versatile Disk (DVD), in a computer-installable or a computer-executable file format.

The program executed by the devices of the above embodiments may be stored in a computer connected to a network, such as the Internet, and may be downloaded via the network. The program executed by the devices of the above embodiments may be provided or distributed via a network, such as the Internet.

The program executed by the devices of the above embodiments has a module structured including the units described above. As actual hardware, a CPU (processor) reads the program from the ROM and executes the program, so that the above units are loaded and generated on a main storage medium.

According to the embodiments, when data is to be distributed to a distribution destination on a network, a user can determine whether or not to execute the distribution before execution of the distribution.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
at least one information processing apparatus;
a connecting unit configured to enable a connection with at least one distribution device via a network;
a reading unit configured to read a document;
a first acquiring unit, at the at least one information processing apparatus, configured to acquire attribute information from the distribution destination which is designated as the at least one distribution destination by a user at the at least one information processing apparatus, the attribute information being a capability of the at least one distribution destination;
a sending unit, at the at least one information processing apparatus, configured to send the acquired information;
a second acquiring unit, at the at least one information processing apparatus, configured to acquire a distribution setting set by the user, the distribution setting being used for generating distribution data from the document and including information on a size of the distribution data per one page;
an output unit configured to display an available number of document sheets, the available number of document sheets being based on the capability of the at least one distribution destination and an estimated value of the size of the distribution data, the estimated value being based on the acquired distribution setting; and
a distribution control unit configured to perform a data distribution process based on a request by the user after the available number of document sheets is displayed.

2. The information processing system according to claim 1, further comprising:
a determining unit configured to determine based on the attribute information whether to distribute the data to the at least one distribution destination, wherein
the distribution control unit distributes the data to the at least one distribution destination when the determining unit determines that the data is to be distributed to the at least one distribution destination.

3. The information processing system according to claim 1, further comprising:
an authenticating unit configured to perform a user authentication process for the user, wherein
the first acquiring unit is configured to acquire the attribute information, the attribute information associated with the authenticated user from the at least one distribution destination.

4. The information processing system according to claim 1, further comprising:
a first authenticating unit configured to perform access authentication of the at least one distribution destination, wherein
the first acquiring unit acquires the attribute information from the at least one distribution destination when the access authentication is successful.

5. The information processing system according to claim 4, further comprising:
a second authenticating unit configured to perform a user authentication process for the user, wherein
the first authenticating unit is configured to perform the access authentication of the at least one distribution destination in coordination with the second authenticating unit performing the user authentication.

6. The information processing system of claim 1, wherein
the distribution setting includes at least a data format of the distribution data and a resolution of reading the document, and
the estimated value is based on the data format and the resolution.

7. A network system comprising:
an information processing system including at least one information processing apparatus and being connected to a network;
at least one electronic device connected to the network;
a display unit at the at least one electronic device;
a reading unit, at the at least one electronic device, configured to read a document;
a first acquiring unit, at the information processing system, configured to acquire attribute information from a distribution destination device which is designated as at least one distribution destination by a user at the at least one electronic device, the attribute information being a capability of the at least one distribution destination;
a sending unit, at the information processing system, configured to send the acquired information to the at least one electronic device;
a second acquiring unit, at the at least one electronic device, configured to acquire a distribution setting set by the user, the distribution setting being used for generating distribution data from the document and including information on a size of the distribution data per one page;
an output unit configured to display an available number of document sheets on the display unit, the available number of document sheets being based on the capability of the at least one distribution destination and an estimated value of the size of the distribution data, the estimated value being based on the acquired distribution setting;
a transmitting unit, at the at least one electronic device, configured to transmit the distribution data to the information processing system; and
a distribution control unit, at the information processing system, configured to perform a data distribution process based on a request by the user at the at least one electronic device after the available number of document sheets is displayed on the display unit of the at least one electronic device.

8. The network system according to claim 7, wherein
the information processing system further includes a determining unit configured to determine based on the attribute information whether to distribute the data to the at least one distribution destination, and
the distribution control unit distributes the data to the at least one distribution destination when the determining unit determines that the data is to be distributed to the at least one distribution destination.

9. The network system according to claim 7, wherein
the information processing system further includes an authenticating unit configured to perform a user authentication process for the user, and
the first acquiring unit is configured to acquire the attribute information, the attribute information associated with the authenticated user from the at least one distribution destination.

10. The network system according to claim 7, wherein
the information processing system further includes a first authenticating unit configured to perform access authentication of the at least one distribution destination, and
the first acquiring unit acquires the attribute information from the at least one distribution destination when the access authentication is successful.

11. The network system according to claim 10, wherein
the information processing system further includes a second authenticating unit configured to perform a user authentication process for the user, and
the first authenticating unit is configured to perform the access authentication of the at least one distribution destination in coordination with the second authenticating unit performing the user authentication.

12. The network system of claim 7, wherein
the distribution setting includes at least a data format of the distribution data and a resolution of reading the document, and
the estimated value is based on the data format and the resolution.

13. An information processing method implemented by an information processing system that includes at least one information processing apparatus and that is connected to at least one electronic device via a network, the information processing method comprising:

reading a document;

first acquiring attribute information from a distribution destination device which is designated as at least one distribution destination by a user at the at least one electronic device, the attribute information being a capability of the at least one distribution destination;

sending the acquired information to the at least one electronic device;

second acquiring a distribution setting set by the user, the distribution setting being used for generating distribution data from the document and including information on a size of the distribution data per one page;

outputting an available number of document sheets, the available number of document sheets being based on the capability of the at least one distribution destination and an estimated value of the size of the distribution data, the estimated value being based on the acquired distribution setting; and performing a data distribution process based on a request by the user after the available number of document sheets is output to the at least one electronic device.

14. The information processing method according to claim 8, further comprising:

determining based on the attribute information whether to distribute the data to the at least one distribution destination, wherein the process of distributing is performed when it is determined that the data is to be distributed to the distribution destination.

15. The information processing method according to claim 13, further comprising:

performing a user authentication process for the user, wherein the first acquiring includes acquiring the attribute information associated with the authenticated user from the distribution destination.

16. The information processing method according to claim 13, further comprising:

performing access authentication of the distribution destination, wherein the first acquiring includes acquiring the attribute information from the at least one distribution destination when the access authentication is successful.

17. The information processing method according to claim 16, further comprising:

performing a user authentication process for the user, wherein the access authentication of the distribution destination is associated with the user authenticated by the user authentication process.

18. The method of claim 13, wherein the distribution setting includes at least a data format of the distribution data and a resolution of reading the document, and the estimated value is based on the data format and the resolution.

* * * * *